United States Patent
Solgaard et al.

(10) Patent No.: US 9,329,308 B2
(45) Date of Patent: May 3, 2016

(54) LONGITUDINALLY GRADED INDEX LENS

(75) Inventors: Olav Solgaard, Stanford, CA (US); Reinhold Dauskardt, Menlo Park, CA (US); Nina Vaidya, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 13/317,768

(22) Filed: Oct. 26, 2011

(65) Prior Publication Data

US 2012/0113637 A1 May 10, 2012

Related U.S. Application Data

(60) Provisional application No. 61/455,744, filed on Oct. 26, 2010.

(51) Int. Cl.
| | |
|---|---|
| *G02B 6/26* | (2006.01) |
| *G02B 3/00* | (2006.01) |
| *G02B 19/00* | (2006.01) |

(52) U.S. Cl.
CPC .......... *G02B 3/0087* (2013.01); *G02B 19/0085* (2013.01); *G02B 19/00* (2013.01); *G02B 19/009* (2013.01); *G02B 19/0042* (2013.01); *G02B 19/0047* (2013.01); *G02B 19/0076* (2013.01); *G02B 19/0095* (2013.01)

(58) Field of Classification Search
CPC .. G02B 19/00; G02B 19/009; G02B 19/0028; G02B 19/0033; G02B 19/0042; G02B 19/0047; G02B 19/0052; G02B 19/0057; G02B 19/0066; G02B 19/0071; G02B 19/1176; G02B 19/008; G02B 19/0085; G02B 19/0095

USPC ........ 385/33–34, 43; 136/243–246, 251–252, 136/256–265; 359/641–642, 652–653, 709; 126/683

See application file for complete search history.

(56) References Cited

U.S. PATENT DOCUMENTS

| | | | | |
|---|---|---|---|---|
| 5,261,970 A * | 11/1993 | Landis et al. | ................. | 136/259 |
| 5,936,777 A * | 8/1999 | Dempewolf | ................. | 359/653 |
| 5,971,551 A * | 10/1999 | Winston et al. | ............... | 359/868 |
| 6,057,505 A * | 5/2000 | Ortabasi | ........................ | 136/246 |
| 6,252,155 B1 * | 6/2001 | Ortabasi | ........................ | 136/246 |
| 6,415,783 B1 | 7/2002 | Harrison | | |
| 7,190,864 B2 * | 3/2007 | Jiang | ................... | G02B 6/4206 385/123 |
| 7,569,764 B2 * | 8/2009 | Shan et al. | ..................... | 136/246 |
| 7,643,719 B1 * | 1/2010 | Zhou et al. | .................... | 385/131 |
| 7,843,572 B2 * | 11/2010 | Tearney et al. | ............... | 356/479 |
| 2001/0006066 A1 * | 7/2001 | Cherney et al. | ............... | 126/698 |
| 2004/0086221 A1 * | 5/2004 | Qiu et al. | ........................ | 385/24 |
| 2005/0265653 A1 * | 12/2005 | Cai et al. | ........................ | 385/28 |

(Continued)

*Primary Examiner* — Ryan Lepisto
*Assistant Examiner* — Guy Anderson
(74) *Attorney, Agent, or Firm* — Lumen Patent Firm

(57) ABSTRACT

An Axially Graded Index LEns (AGILE) is provided. Such optical elements can provide optical concentration in excess of the free-space brightness theorem limit, because of the increased refractive index at the output of the concentrator compared to the input. Optical contact (i.e., no intervening low index material) between the AGILE and the absorbing element (or an optical source) can be employed to ensure no loss of brightness at the interface between the AGILE and the absorbing element (or source). Although solar cell concentration is a significant application of this technology, there are various other applications, such as increasing the efficiency of optical emission, and providing transmissive optical windows that include optically cloaked regions.

18 Claims, 8 Drawing Sheets

(56) References Cited

U.S. PATENT DOCUMENTS

| | | | |
|---|---|---|---|
| 2006/0018596 A1* | 1/2006 | Loebel | 385/38 |
| 2006/0174867 A1* | 8/2006 | Schaafsma | 126/683 |
| 2007/0246040 A1* | 10/2007 | Schaafsma | 126/698 |
| 2007/0251569 A1* | 11/2007 | Shan et al. | 136/246 |
| 2008/0254210 A1* | 10/2008 | Lai et al. | 427/162 |
| 2009/0136237 A1* | 5/2009 | Martini | G02B 6/132 398/141 |
| 2009/0272424 A1* | 11/2009 | Ortabasi | 136/246 |
| 2010/0091254 A1* | 4/2010 | Travis et al. | 353/99 |
| 2010/0135615 A1* | 6/2010 | Ho et al. | 385/33 |
| 2010/0269886 A1* | 10/2010 | Argentar | 136/246 |
| 2010/0307553 A1* | 12/2010 | Defries et al. | 136/243 |
| 2011/0038625 A1* | 2/2011 | Zellers et al. | 396/133 |

\* cited by examiner

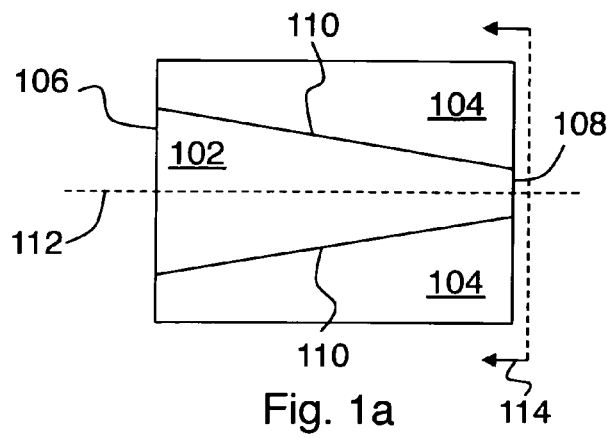
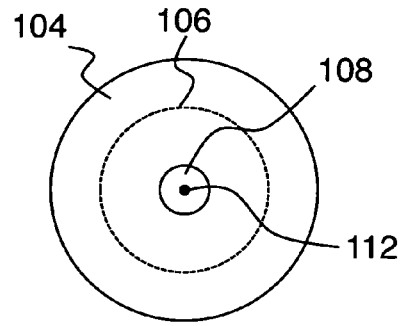
Fig. 1a          Fig. 1b
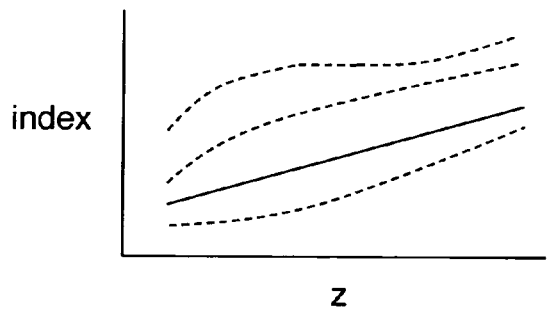
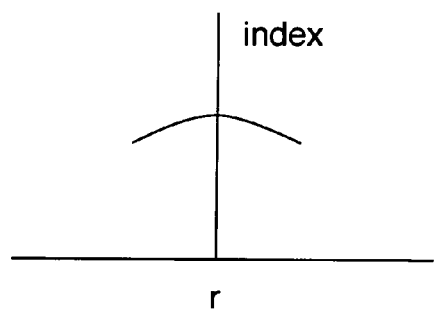
Fig. 2a          Fig. 2b
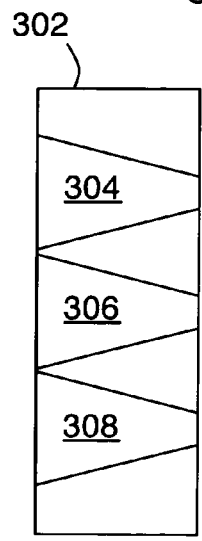
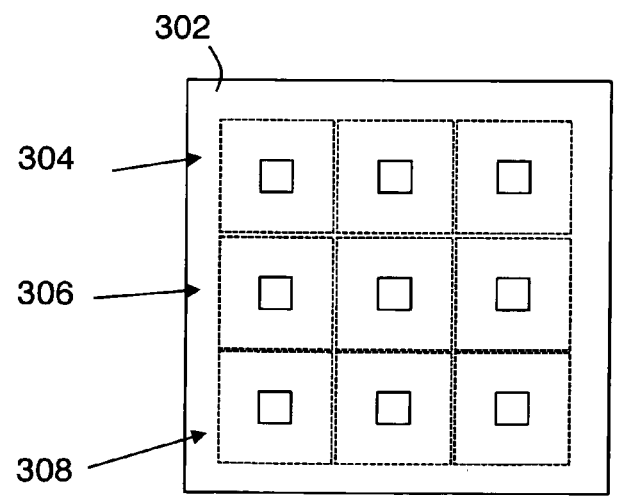
Fig. 3a          Fig. 3b

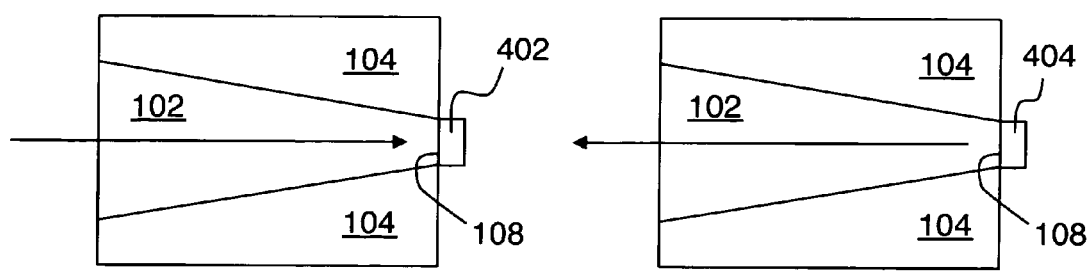
Fig. 4a                    Fig. 4b
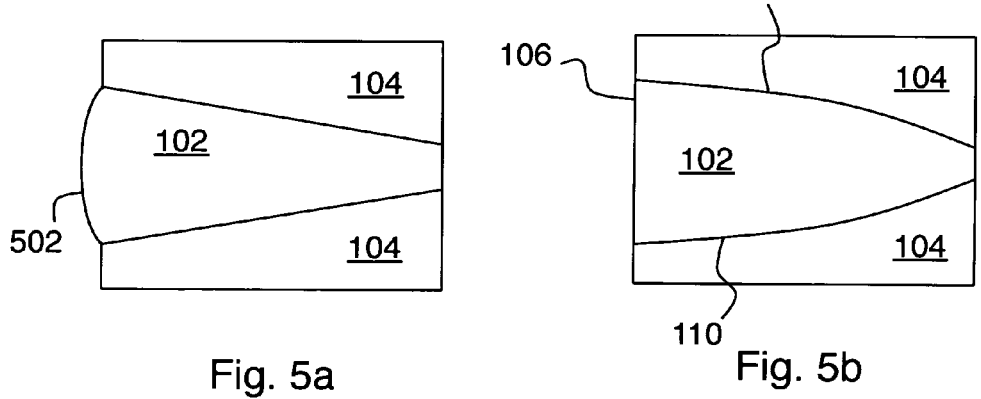
Fig. 5a                    Fig. 5b

LONGITUDINALLY GRADED INDEX LENS

CROSS REFERENCE TO RELATED APPLICATIONS

This application claims the benefit of U.S. provisional patent application 61/455,744, filed on Oct. 26, 2010, entitled "Graded Index Lens as a Nontracking Solar Concentrator", and hereby incorporated by reference in its entirety.

FIELD OF THE INVENTION

This invention relates to optical concentrator elements.

BACKGROUND

Solar energy has been considered as an energy source for many years. In this context, techniques for concentrating solar radiation have been extensively investigated. Since it is not necessary to form an image, non-imaging optics (which have a higher collection efficiency than imaging optics) can be employed. One conventional example of a non-imaging solar concentrator is known as the compound parabolic concentrator (CPC). The maximum concentration provided by the CPC is $1/\sin^2\theta$, where $\theta$ is the acceptance half angle of the larger aperture of the concentrator. It would be an advance in the art to provide larger concentration than provided by conventional approaches such as the CPC.

SUMMARY

To better appreciate principles of the invention, it is helpful to briefly review the constant brightness theorem, which says that the optical power flow per unit of area and solid angle cannot be increased though a passive optical system: i.e., luminance is invariant.

This statement of the constant brightness theorem implicitly assumes the refractive index RI is the same at the input and output apertures. Since optical systems typically have free space apertures (i.e., RI=1) for both input and output, this implicit assumption is justified in practice much more often than not.

However, it is known that higher brightness can indeed be achieved inside a high refractive index (RI) material. For example, the diameter of a diffraction limited spot is reduced by the square of the RI of the material relative to the diameter of a diffraction limited spot of the same light in free space. This reduction in spot size is equivalent to higher brightness.

The present approach is based on exploiting this possibility to provide enhanced concentration. A concentrator with an area reduction ratio less than or equal to the square of the ratio of RI from input to output is, in principle, capable of accepting all input modes. For photovoltaic (PV) systems where the solar energy enters the system in air (RI≈1) and is absorbed in a high index PV (RI3.5), the theoretical concentration is $(3.5/1)^2=12.25$. To achieve this level of concentration will require development of transparent, high RI materials, but a concentration factor on the order of ~5 over the solar spectrum is possible with readily available materials. This allows for near-term development of non-pointing, concentrated systems that not only improve efficiency and reduce the needed amount of PV material, but also efficiently capture diffuse light, whose percentage can be very significant even on clear days. More generally, the concentration ratio that can be provided by the present approach is not limited to $(3.5)^2$. Arbitrary values of concentration ratio are possible, provided a sufficient index gradient can be established, as described in greater detail below.

However, it is important to note that some approaches for using high index to improve concentration will not work. For example, a simple two layer structure with the input in the low index material and the output in the high-index material will experience significant reflection loss at the interface between these materials. This loss could be mitigated by the use of an anti-reflection coating at the interface, but this undesirably complicates the design, especially in concentrator applications where a large angular acceptance range is usually required.

In the present work, this difficulty is avoided by grading the index of refraction continuously along the longitudinal direction. The term axial is often used as a synonym for longitudinal. The axial (or longitudinal) direction is the direction that light generally propagates in when passing through the element. Thus, it is convenient to refer to the resulting optical element as an Axially Graded Index LEns (AGILE).

BRIEF DESCRIPTION OF THE DRAWINGS

FIGS. 1a-b show side and end views of an embodiment of the invention.

FIG. 2a shows longitudinal index grading in the embodiment of FIGS. 1a-b.

FIG. 2b shows optional radial index grading in the embodiment of FIGS. 1a-b.

FIGS. 3a-b show an array having array elements according to an embodiment of the invention.

FIGS. 4a-b show applications of embodiments of the invention.

FIG. 5a shows an embodiment of the invention having a curved surface at the low-index port of the device.

FIG. 5b shows an embodiment of the invention having a parabolic side surface shape.

FIG. 10b shows a window assembly including several of the transmission element of FIG. 10a.

FIG. 10c shows the window of FIG. 10b further including a cloaked device which cannot be seen by light passing through the window.

DETAILED DESCRIPTION

A) General Principles

Figures 6A, 6B:
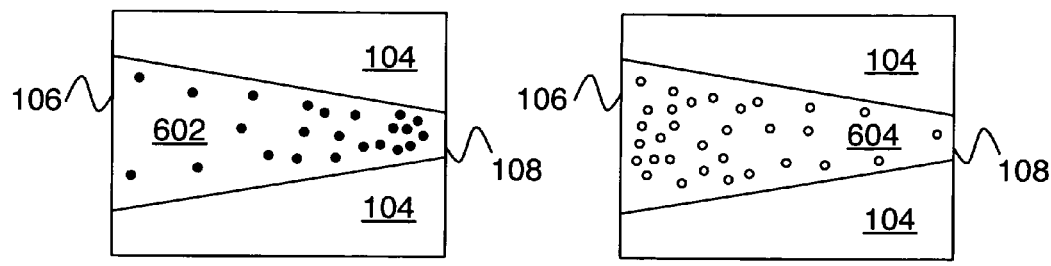
FIGS. 6a-b show exemplary approaches for providing a graded index.

FIGS. 1a-b show an exemplary embodiment of the invention. FIG. 1a is a side view, and FIG. 1b is a corresponding end view along line 114 of FIG. 1a. An optical element 102 has a first port surface 106 and a second port surface 108. The first and second port surfaces 106 and 108 are on opposite sides of optical element 102. A sidewall element 104 is in contact with and disposed around optical element 102, such that the first and second port surfaces 106 and 108 are not covered by the sidewall element 104. Axis 112 is disposed in the longitudinal (i.e., axial) direction on this figure.

Optical element 102 has a refractive index that continuously increases from the first optical port surface 106 to the second optical port surface 108. Some examples of such an index profile are shown on FIG. 2a, where z is the longitudinal position coordinate along axis 112. The solid line shows linear index grading, and the dotted lines show some other exemplary possibilities. For simplicity of exposition, we define a "continuously increasing index profile" as any continuous index profile n(z) that satisfies the mathematical condition $n(z2) \geq n(z1)$ if $z2 > z1$. Thus, this definition corresponds to a non-decreasing continuous function as customarily defined in mathematics.

Typically, sidewall element 104 has a generally funnel-like shape that decreases continuously in cross section area from the first optical port surface 106 to the second optical port surface 108, as in the example of FIGS. 1a-b. Preferably, interior surface 110 of sidewall element 104 is optically reflective in order to facilitate optical transmission between ports 106 and 108.

In some cases, optical element 102 has rotational symmetry about its axis 112. This symmetry can be a continuous symmetry (i.e., circular symmetry) as in the example of FIGS. 1a-b. This symmetry can also be a discrete N-fold symmetry. The array example of FIGS. 3a-b shows a situation where 4-fold symmetry of the optical elements is useful. FIG. 3a is a side view, and FIG. 3b is a corresponding end view of an array of optical elements (three of which are referenced as 304, 306, and 308) dispose in sidewall element 302. The square shape of the optical elements improves optical collection efficiency for the array compared to what would be obtained from circular optical elements. As indicated below, the sidewall shape can be any shape, such as linear, parabolic, etc. For any of these sidewall shapes, it is possible to make them symmetric as described above. For example, a parabolic sidewall shape can be rotated about the central axis to generate a symmetric paraboloid of revolution. Since the sidewall is in contact with the optical element, the sidewall surface and the optical element have the same symmetry with respect to the central axis.

Optionally, radial index grading can be combined with the above described longitudinal index grading. FIG. 2b shows an example of such grading in connection with the example of FIGS. 1a-b. When radial index grading is employed, it is preferred for the refractive index of the optical element to continuously increase as radius with respect to the central axis decreases. More specifically, $n(r1) \geq n(r2)$ if $r1 < r2$, where r1 and r2 are radial positions with respect to the symmetry axis.

FIGS. 4a-b show applications of embodiments of the invention. In the example of FIG. 4a, optical port surface 108 is in optical contact with an absorbing element 402. This apparatus is a concentrator of incident light onto the absorbing element 402. Suitable absorbing elements include, but are not limited to: photovoltaic solar cells, thermal solar cells, cameras, charge coupled device arrays and imaging devices. Here optical contact refers to a situation where there is no intervening low-index material between surface 108 and absorber 402. Preferably, the refractive index of second port surface 108 and the refractive index of absorbing element 402 are substantially the same (i.e., differing by less than 10%, more preferably by less than 5%).

The main differentiating factor of AGILE with the competing technologies is that concentration is achieved without need to track the sun and very low cost production is expected. The present parabolic shaped concentrators (CPCs) have a typical concentration factor of $1/\sin(\theta)$, where $\theta$ is the acceptance angle. For even as little as 25 degree acceptance angle this ratio is only about 3. The maximum concentration from a parabolic 2-d concentrator is $1/\sin^2(\theta)$. AGILE designs, when optimized with a parabolic shape could have a much higher concentration of $(RI\ ratio)^2/\sin^2(\theta)$. We believe that by using a graded index material we can achieve even more concentration with less stringent pointing accuracy requirements than conventional approaches.

Current concentrator systems do a good job of concentrating light from a limited range of angles, and the principles developed for this type of non-imaging optics can be used with the present approach (e.g., providing useful shapes for sidewall element 104 of FIG. 1a), but the key to substantial improvement is precisely the high density of states provided by high RI materials. The best existing passive concentrators take advantage of the RI of 1.45 of common optical glasses. With the present approach, these systems can be improved by going to high RI materials like SiN and SiC. By increasing the RI from 1.45 to 2.5, we improve the concentration of these systems by a factor of $2.5^2/1.45^2=3$. This three-fold improvement will make a very significant difference in practical systems, and in the long term there is potential for substantially bigger gains.

For large scale Photovoltaic conversion, real estate will be the limiting factor; and only PV technology the highest achievable conversion efficiency will be viable. The present approach can enable two important advances: (1) high efficiency flat panels for residential installations, and (2) robust, easy to maintain, large scale PV installations that may operate in hybrid fashion, e.g. by combining PVs with solar thermal and/or solar thermo-emission.

The AGILE enables high-efficiency, passive flat panels by creating low-cost, miniature, passive concentrator arrays that power high-efficiency PVs (triple-junction III-V semiconductors in today's technology). These passive flat panels will be plug-ins for today's silicon panels. The low-cost and simple installation of the AGILEs, combined with the reduced area of the PVs, will make this conversion technology significantly cheaper than competing PV technologies, but most importantly, it will boost total energy production from residential installations by more than several factors over high-quality PVs. In high-concentration utility scale conversion systems, the AGILE translates into reduced requirements on design, optical components, construction quality, pointing accuracy, and long-term stability. Combining concentrators with high efficiency solar cells is the best way to make solar energy large scale by harnessing high efficiency at an optimum cost with minimum land utilization.

The AGILE concentrator enables cost-effective, utility-scale, photovoltaic installations by simplifying the design, construction, installation and, most importantly the maintenance of high-concentration (~1,000 suns) concentrated solar PV systems. The basic completely passive AGILEs that we have simulated and demonstrated give a concentration of several suns. In high-concentration systems this translates into reduced requirements on design, optical components, construction quality, pointing accuracy and long-term stability. Over the life time of the PV installations, this leads to substantial cost savings and allow the facility to operate at maximum efficiency even under sub-optimal conditions.

In the example of FIG. 4b, optical port surface 108 is in optical contact with an optical source 404. This apparatus can improve efficiency of optical emission from source 404. Suitable optical sources include, but are not limited to: thermal light sources, light emitting diodes, and lasers. For example, efficiency of light emission from an light emitting diode can be increased by this approach. Similarly, laser output coupling may be made more efficient. Here optical contact refers to a situation where there is no intervening low-index material between surface 108 and source 404. Preferably, the refractive index of second port surface 108 and the refractive index of source 404 are substantially the same (i.e., differing by less than 10%, more preferably by less than 5%).

Although achieving optical contact can be difficult to achieve in a research laboratory setting where one is working with finished devices having coatings that interfere with optical contact (as in the experiments described below), optical contact should not be difficult to achieve in a manufacturing setting. For example, final processing of photovoltaic solar cells could include bonding to an appropriate AGILE structure instead of the normal solar cell coatings.

First port surface 106 of an AGILE can be modified in various ways to enhance performance. Curved surfaces can be employed to enhance optical efficiency. Diffractive optical elements can also be disposed on this surface. FIG. 5a shows an example having a curved surface 502 as the low-index port of the device. Practice of the invention does not depend critically on the sidewall shape. The preceding examples have shown linear sidewalls. Any sidewall shape can be employed. One possibility of special interest is a parabolic sidewall shape, as in the example of FIG. 5b. Such a sidewall shape, with reflective interior surfaces, can desirably improve the concentration. The aspect ratio of the AGILE (i.e., its height to width ratio) shouldn't be too large or too small, but a range of intermediate values for aspect ratio should be suitable, depending on details of the design. In simulations described in greater detail below, a diameter of 3.5 at the low index side, a diameter of 1 at the high index side, and a height of 5 has worked well. These are given as unitless numbers here because these ratios can be scaled together to any values.

Various approaches for providing the longitudinally graded refractive index in element 102 can be employed. One way to achieve this 3-D gradient is by particle surface interactions. For example, for a radial gradient we can make the side walls and particles hydrophobic or similarly charged, and at the same time increase density of particles along the axis by gravity. In the example of FIG. 6a, optical element 602 includes high-index nano-particles (solid dots) that increase in density from first optical port surface 106 to second optical port surface 108, thereby increasing the refractive index from port 106 to port 108. In the example of FIG. 6b, optical element 602 includes low-index nano-pores (open circles) that decrease in density from first optical port surface 106 to second optical port surface 108, thereby increasing the refractive index from port 106 to port 108.

Figures 7A, 7B:
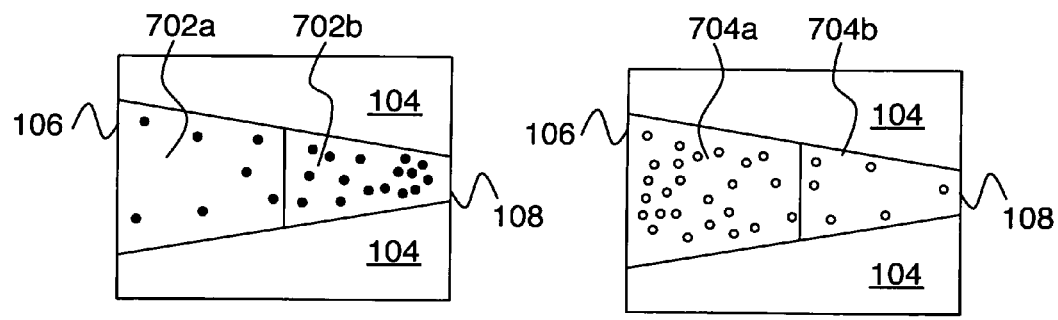
FIGS. 7a-c show further exemplary approaches for providing a graded index.
Figure 7C:
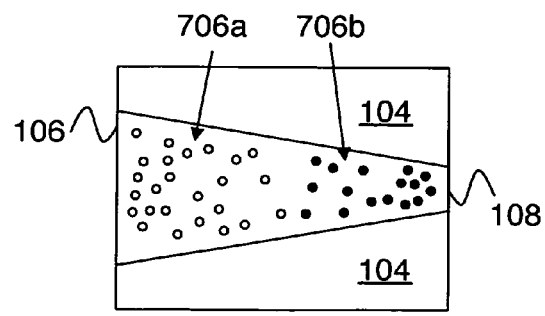

Multi-layer structures can also be employed, as in the example of FIGS. 7a-b. The example of FIG. 7a shows nano-particle grading in two layers of different material 702a and 702b. Similarly, the example of FIG. 7b shows nano-pore grading in two layers of different material 704a and 704b. Any number of layers can be employed. Preferably, the index discontinuity at the layer interfaces is low (i.e., less than 10%, more preferably less than 5%). Any other approach for providing graded index material can also be employed, such as meta-materials. FIG. 7c shows a further approach for providing RI grading, where region 706a of the optical element has a graded distribution of nano-pores (open circles), and region 706b has a graded distribution of nano-particles (solid dots). There are numerous other ways to use such inclusions to provide refractive index grading, all of which are suitable for practicing the invention. For example, nano-particle and/or nano-pore size and/or composition can be graded in addition to or alternatively to grading the density of particles/pores.

Inclusions in element 102 can serve other purposes in addition to index grading. In some cases, it can be beneficial to include scattering centers in element 102, so that light passing through the element is diffused to provide more spatially uniform optical emission from the optical element. Such increased uniformity can be beneficial in various applications (e.g., to reduce hot spot formation in solar concentrator applications.).

B) Simulations

Figure 8:
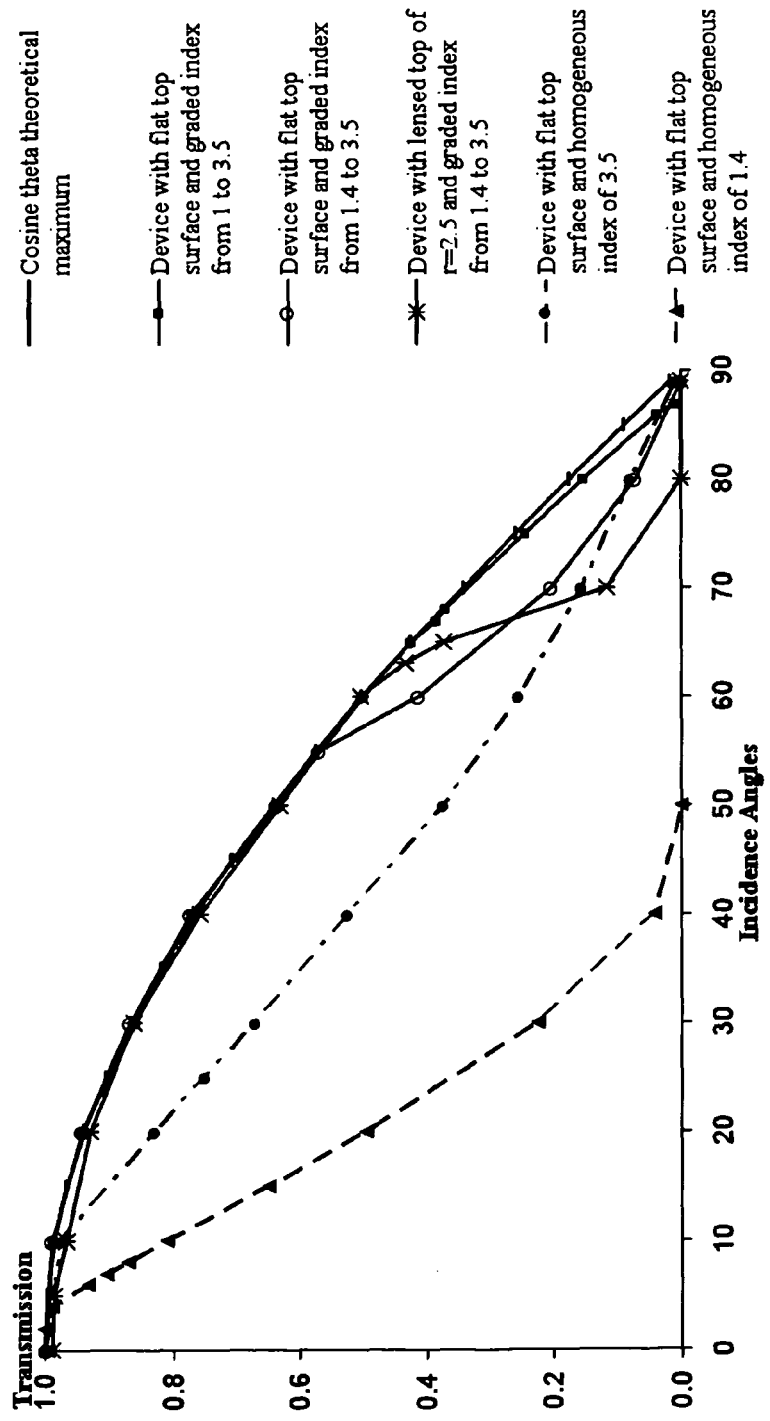
FIG. 8 is a plot of simulation results comparing embodiments of the invention to other structures.

The results of our numerical simulations of AGILE power concentration are summarized in FIG. 8 that shows the calculated output power for different geometries and incidence angles. The graphs show the power through the output aperture relative to the power in an input beam which has a cross section equal to the input aperture, which means that the maximum possible output power goes as cosine theta, where theta is the incident angle (solid line). As expected, AGILEs with area ratios smaller than the square of the RI ratio follow the cosine-theta loss very closely up to angles as large as 85 degrees. As we make the height of the AGILE smaller and the area ratio larger, the curves deviate from the cosine theta curve.

In contrast to the AGILE, other simple geometries fail to approach perfect light capture. Homogeneous index structures (solid circle and solid triangle on FIG. 8) lead to substantial amounts of incident-light rejection. That is apparent as a reduced transmission at higher incident angles in FIG. 8. All the concentrators simulated in FIG. 8 have the same shape. The input diameter is 3.5, the output diameter is 1, and the height is 5. Simulations are done with the ray tracing software FRED® (available from Photon Engineering LLC), and Fresnel reflections at the top surface are not included.

C) Experimental Fabrication and Results

Figure 10A:
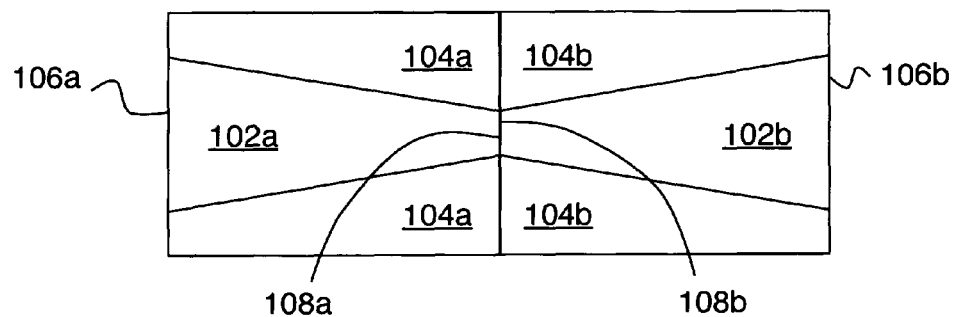
FIG. 10a shows an optical transmission element according to an embodiment of the invention.

Fabrication: The simple shape of the AGILE can be made in a number of low-cost industrial processes. For the experimental demonstration, we chose to make AGILE shapes by reaming cones in Aluminum plates. Two structures were made: single AGILEs (e.g., as on FIG. 1a) and back-to-back AGILEs, as shown in FIG. 10a (described in greater detail below). In our single AGILE prototypes, the cone diameters go from 7 mm to 5 mm over a height of 10 mm, i.e. the area reduction ratio is 1.96. The single AGILE is the basic structure to be demonstrated, but the back-to-back AGILEs are easier to test. The single AGILE structure has the issue that to collect all modes at the bottom, it has to be optically bonded to the photodetector with an appropriate AR coating. In the back-to-back AGILE, measurement of transmission is easier, because the transmitted power is in air, so a standard photodetector with a standard AR coating is sufficient.

UV optical adhesives of different refractive indices NOA84 (1.46), NOA 89 (1.51), NOA74 (1.52), NOA68 (1.54), NOA63 (1.56) were used to fill the AGILEs. Spectrophotometer measurements were done for different film samples to characterize the optical adhesives. Different materials were found to have different curing requirements, some shrink substantially during curing, some need to be cured in inert atmosphere, and some need age hardening after curing to achieve the required transparency and refractive index. These differences along with removal of air bubbles before curing and ways to make uniform layer heights were taken into consideration during fabrication.

Figure 9:
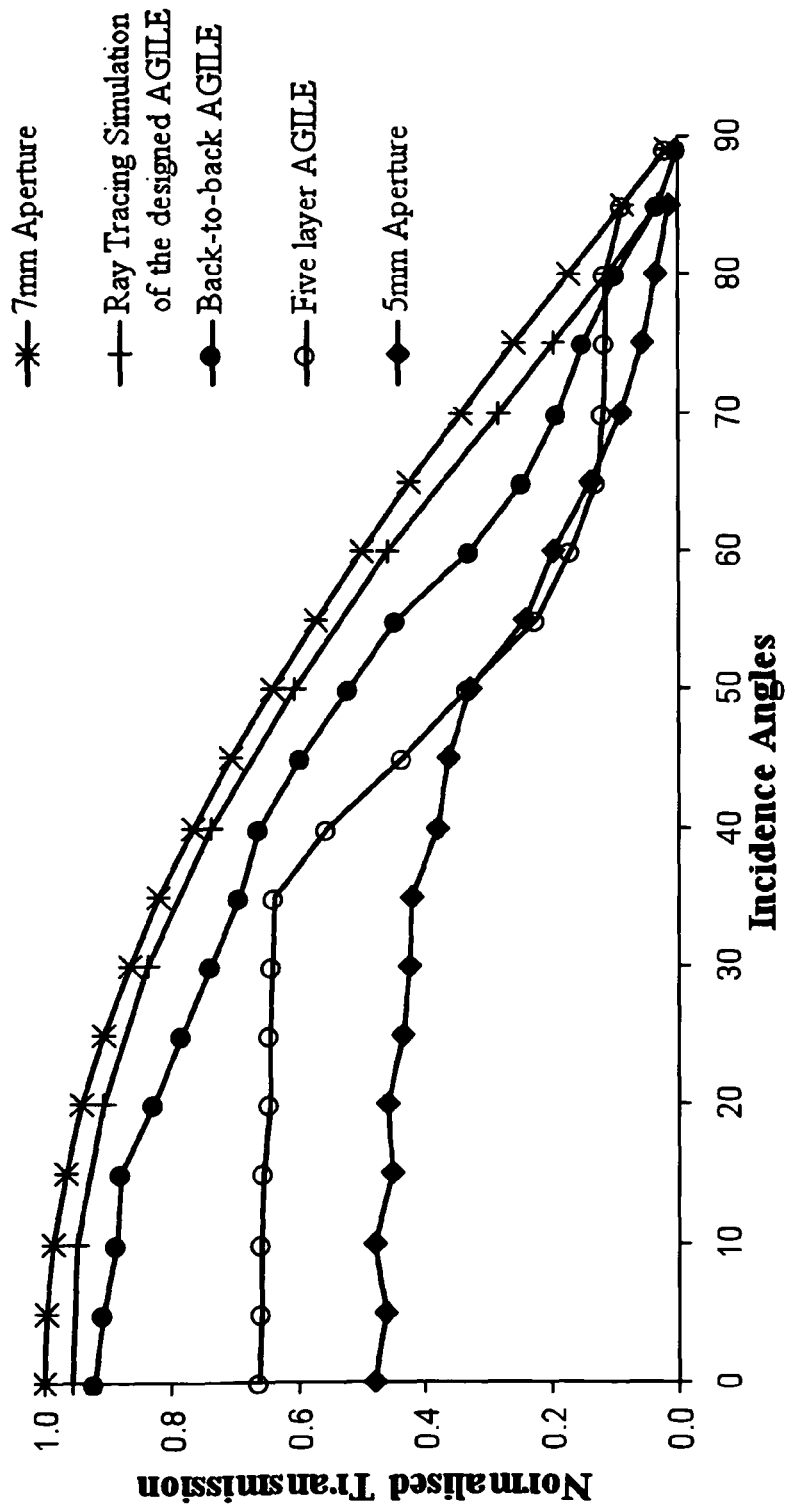
FIG. 9 is a plot showing a comparison of simulation results and experimental results relating to principles of the invention.

Experimental Demonstration and Results: Test set up for measuring AGILE's light concentration ability included a red laser (HeNe Laser, 632.8 nm, 0.5 mW, polarized), beam expander, AGILE mounted on the rotational stage with the solar cell detector. We have measured the voltage obtained from the solar cell detector at different incidence angles of light on the AGILE to represent the light concentrated at the output and represented this as normalized transmission in FIG. 9. The solar cell detector made was calibrated and verified to be working in the linear range. For these measurements, the input face of the AGILE is located at the centre of rotation for every device. The results of FIG. 9 are average values, since each voltage reading has been taken several times and the mean value calculated. The measurements are done in one plane, but they also have the full 360 degree azimuthal symmetry (important for solar applications).

The back-to-back structures give very good performance and are able to concentrate most of the light that is incident on the 7 mm diameter circular aperture through the smaller 5 mm aperture in the middle. This result should be the same for the 5 layer single AGILE, but reflections at the AGILE-photodetector interface (i.e., optical contact as described above was not achieved in this experiment), lead to reduced transmission as shown in FIG. 9. The figure shows a roughly sinusoidal modulation on the transmission through the back-to-back AGILE. This is likely due to interferences in the layered structure of the AGILE or passivation on the detector. The sine wave modulation is more pronounced with single wavelength than with broadband illumination. As expected, the transmissions through all AGILEs fall between those of the 5 mm diameter aperture (diamonds on FIG. 9) and the 7 mm diameter maximum aperture (stars on FIG. 9). It is noteworthy that the back-to-back AGILE results (filled circles) follow the theoretical maximum quite well over the full angular range.

Conclusions and Implications: The AGILE as an effective non-tracking concentrator was conceptualized, simulated and fabricated. The simple to test back-to-back AGILE demonstrated a concentration of about 2 and tracked the cosine theta theoretical maximum for all incident angles. The AGILE is a versatile concept that rests on fundamental physical laws, and it has the potential to greatly simplify PV systems. Its development into a practical technology presents substantial challenges in material science and fabrication. The ultimate AGILE requires transparent, broadband materials with RI gradually ranging from 1 to 3.5 and beyond. The extreme low values of RI can be achieved in porous materials and sol-gels, while higher RI materials may be created in polymers with controlled distributions of high index nano-particles and other sub-wavelength structures.

D) Further Fabrication Considerations

Development of robust, low loss, transparent in broadband and inexpensive graded RI materials is important for this approach. We have successfully fabricated graded RI structures by filling stencils with layers of thin films with controlled distributions of nano-particles.

In one experiment, AGILE fabrication was done as follows:
a) Silicon nanoparticles (IR=3.5) were dispensed in a PDMS matrix. Si and PDMS both have transparency bands at Infra Red wavelengths. PDMS, which is CH3[Si(CH3)2O]nSi(CH3)3, is very stable and does not react with Si. Si particles used are of 100 nm average diameter, i.e. much less than the design source wave lengths in IR.
b) Molds of Aluminum, Teflon, and Polypropylene were micro-machined. Teflon had the best thermal properties for PDMS curing without sticking, and also gives a good surface finish.
c) Stencils were made by using these molds by curing PDMS around them, and then removing the molds.
d) Gold was sputtered on the side walls of the stencils to make them reflecting.
e) Ten layers of PDMS solution with increasing density of Si nano-particles were cured in the stencils to complete the AGILE.

The first measurements of our Si-nano-particle AGILEs showed a lower transmitted power than expected for this material system. Close inspection of the fabricated AGILEs indicate that the reasons for the extra loss are reflections from the interface between the AGILE and the photodetector underneath, reflections from the interfaces between the 10 PDMS films, and scattering from clusters of Si nano-particles. Each of these problems is being addressed in the second generation AGILEs we are now fabricating and testing. We are now using arrays of Aluminum molds that allow us to create a high-quality optical surface on the AGILE output for a close coupling to the PV material, and we are developing rapid dispensing techniques that minimize the discontinuity between layers of different RIs. Lastly, we are investigating surface treatment of the nano particles to stop them from attaching to each other and clumping.

We are fabricating AGILE arrays for visible light frequencies, using Aluminum arrays and filling them with layers of different refractive index polymers/optical adhesives/glass slab and transparent nano particles (SiC and SiN) in polymer solutions. This single-sided structure has the issue that modes collected at the bottom in the high index material have to be directly incident on the detector, any air gap would add huge losses. For ease of detection, a back to back structure is being fabricated so that light goes from air to high index material and then back in air and if the output power is comparable to input power then we have proof of concentration in the middle neck of the structure (e.g., as in the previously described experiment).

Graded-index materials with RI up to and beyond 2.5 can be made by including high RI particles of sub-wavelength dimensions. The materials of choice are silicon nitride ($Si_3N_4$) and silicon carbide (SiC). Silicon nitride is chosen for its relatively high RI (RI=2 for stoichiometric $Si_3N_4$, and up to RI=2.3 for Si-rich SiN). Silicon carbide has even better potential as the main building block of high-RI optics. Its RI ranges from 2.6 to 2.7 over the solar spectrum. Optical meta-materials may provide RI greater than the 2.6 to 2.7 range that is achievable with Silicon Carbide by shifting our focus to optical meta-materials. Optical meta-materials that are most promising for high RI are materials based on nanocone structures, which can be fabricated by a scalable low temperature process. Magnetic sub-wavelength particles may also provide a way to increase the RI.

Techniques to co-segregate both high RI nano-particles and sacrificial porogen nano-particles to create low RI matrix regions within the same hybrid glass matrix material by particle-surface interactions may be applicable. Multi-stage film deposition for this gradation may provide the desired wide range of RI values. This work includes controlling both the hybrid matrix compositional gradient in the AGILE, as well as co-segregation of nano-particles and porosity to either increase or decrease the dielectric properties. SiC and SiN nano-particles in matrix polymers may provide high index transparent materials. For the low end of refractive indices, aero-gels, nano porosity in silica, or even low index transparent materials like magnesium fluoride, $MgF_2$ (with an index of 1.38) can be used. The low index end surface of AGILE would need to be made mechanically robust by surface treatment.

To implement the large scale graded AGILE material, we can use hybrid molecular glasses with organic and inorganic molecular components tailored by self-organization at nanometer length scales. They have unique optical transparency and thermomechanical properties and can be engineered to selectively transmit electromagnetic waves. Not only do these hybrid materials have unique optical and thermomechanical properties, but they can also be made with selected dielectric and RI properties. We have already demonstrated RI values in the range 1.3 to 1.9 by incorporation of templated nanoporosity. Controlling both the hybrid matrix compositional gradient in the AGILE as well as co-segregation of nano-particles to either increase or decrease the dielectric and RI properties may be used to increase the RI range and/or to provide combined longitudinal and radial index grading.

Nano-particle segregation can be achieved by (1) directing diffusion of charged nano-particles by applying an electric field, (2) using hydrophilic and hydrophobic interaction between functionalized particles and the AGILE surface to direct particle segregation, and (3) gravitational settling of nano-particles in solution, or by using a centrifuge. The hybrid matrix can be made using inexpensive sol-gel solution processing and is ideally suited for this type of directed processing. The choice of nano-particle material is important and will determine how much increase in RI can be achieved. Reductions in RI can be achieved by the incorporation of sacrificial templating organic nano-particles such as functionalized polystyrene that can be caused to segregate towards or away from AGILE surfaces as recently demonstrated on flat substrates. Multi-stage film deposition for this gradation will also be attempted to achieve the wide range of RI values desired.

Thin films with a gradient of refractive index from 1.3 to 1.9 have already been fabricated using polystyrene templates that are volatized during processing to create low density and low RI materials. In essence, the gradation of RI from 1 (air) to 1.4 (PDMS/GLASS) is just as important and challenging as from 1.4 to 3.5. Further reduction of RI will entail reducing density. Such low density materials would be similar to aerogels/zero-gels. Our concern for these materials is the fragile nature and an important component of our work would be to develop hybrid materials like the bridge molecules. The fragile top part of the very low index material which is exposed to the environment can be made significantly more robust by using bridged precursor molecules (e.g. Si—C-C—Si backbones) in the hybrid glass. They can be made extremely resistant to environmental and photochemical degradation, can have outstanding thermomechanical properties, and can possess excellent adhesion to a wide range of stiff and flexible substrates. Recent experiments exhibit unprecedented mechanical strength and durability for transparent glasses, withstanding >300 hrs of intense UV and water spray without loss of properties. This is important since robust AGILE materials that are exposed to terrestrial solar environments are essential for long term durability.

The expected fabrication process for large AGILE arrays is to fill low-cost, molded stencils with thin films of decreasing RI till the stencil is filled and the large-scale AGILE array is completed. For sufficiently thin films, a continuously graded index profile can be obtained in this manner, as opposed to a discontinuous index profile. This is an automated process that relies on well-proven techniques, giving it the potential for low-cost production and economies of scale. The resulting AGILEs will be low cost, robust and easy to install which saves expensive solar cell area and real estate, giving them the potential for wide-spread adoption.

E) Novel Applications

FIG. 10a shows a back to back AGILE structure, which is an optical transmission element that includes a first AGILE (102a, 104a) and a second AGILE (102b, 104b). The second port surface 108a (i.e., the high index port) of the first AGILE is in optical contact with the second port surface 108b (i.e., the high index port) of the second AGILE. Here optical contact refers to a situation where there is no intervening low-index material between surface 108a and surface 108b. Thus, light can propagate from port surface 106a of the first AGILE to port surface 106b of the second AGILE while being concentrated to fit through the high index ports 108a, 108b.

As indicated above, this kind of structure is useful for experimental demonstrations, since difficulties in achieving the optical contact between a high-index AGILE port and a detector in a research setting are avoided. However, this structure also has applications in its own right. It is convenient to refer to this structure as a pixel element, and to refer to ports 106a and 106b as first and second pixel faces of this pixel element. These pixel faces are optically coupled to each other because light can be transmitted from one pixel face to the other through the pixel element.

Figures 10B, 10C:
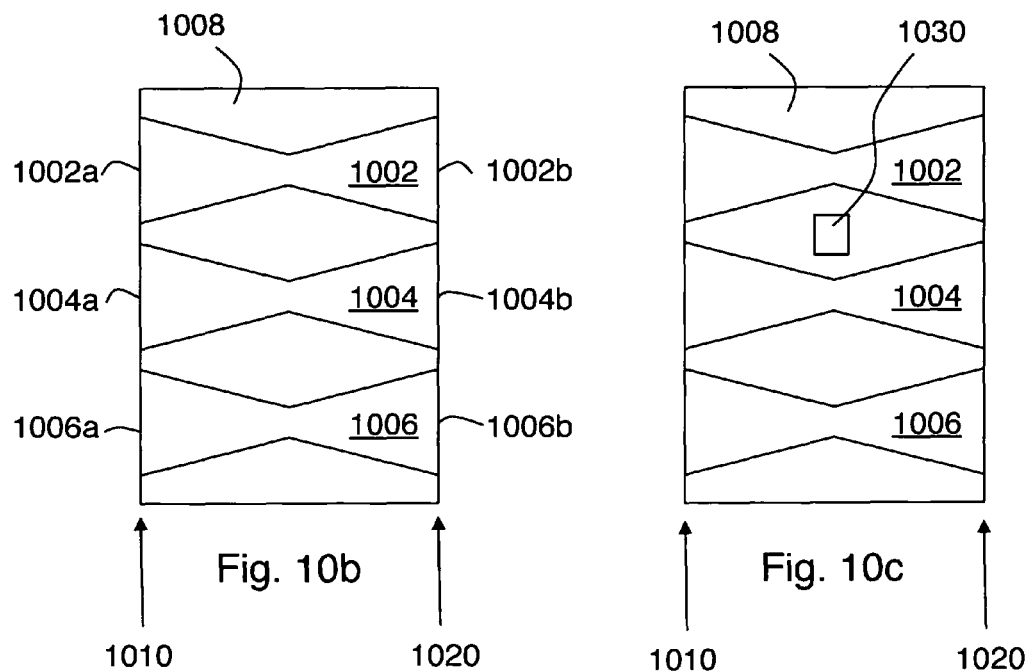

FIG. 10b shows a window including several of the pixel elements of FIG. 10a. Here a first window surface 1010 includes the first pixel faces 1002a, 1004a, and 1006a of the pixel elements 1002, 1004 and 1006, and a second window surface 1020 includes the second pixel faces 1002b, 1004b, and 1006b of the pixel elements. To first order, the arrangement of FIG. 10b can serve as a window. Such a window preferably has low optical transmission loss and distortion in the pixel elements, and has a high ratio of total pixel face area to window area, so that it approaches an ideal window in performance.

However, a remarkable feature of such a window is that objects can be inserted into the window that are invisible to an outside observer, who sees an apparently transparent window with no evident features relating to the concealed object. FIG. 10c shows an example. Here a device 1030 is disposed between the first and second window surfaces 1010 and 1020 (i.e., it is in the window, and would normally be visible). However, device 1030 is also disposed between the pixel elements, effectively cloaking it from outside observation because light that passes through the window is entirely inside the pixel elements. In other words, light that passes through the window does not intersect device 1030. Although this example shows only a single device, any number of devices can be concealed in this manner. For applications of this general type, it is preferred for the concentration ratio of the AGILEs to be as high as possible with as high index material as possible in the middle, to maximize the cloaked volume of the window.

Figure 10D:
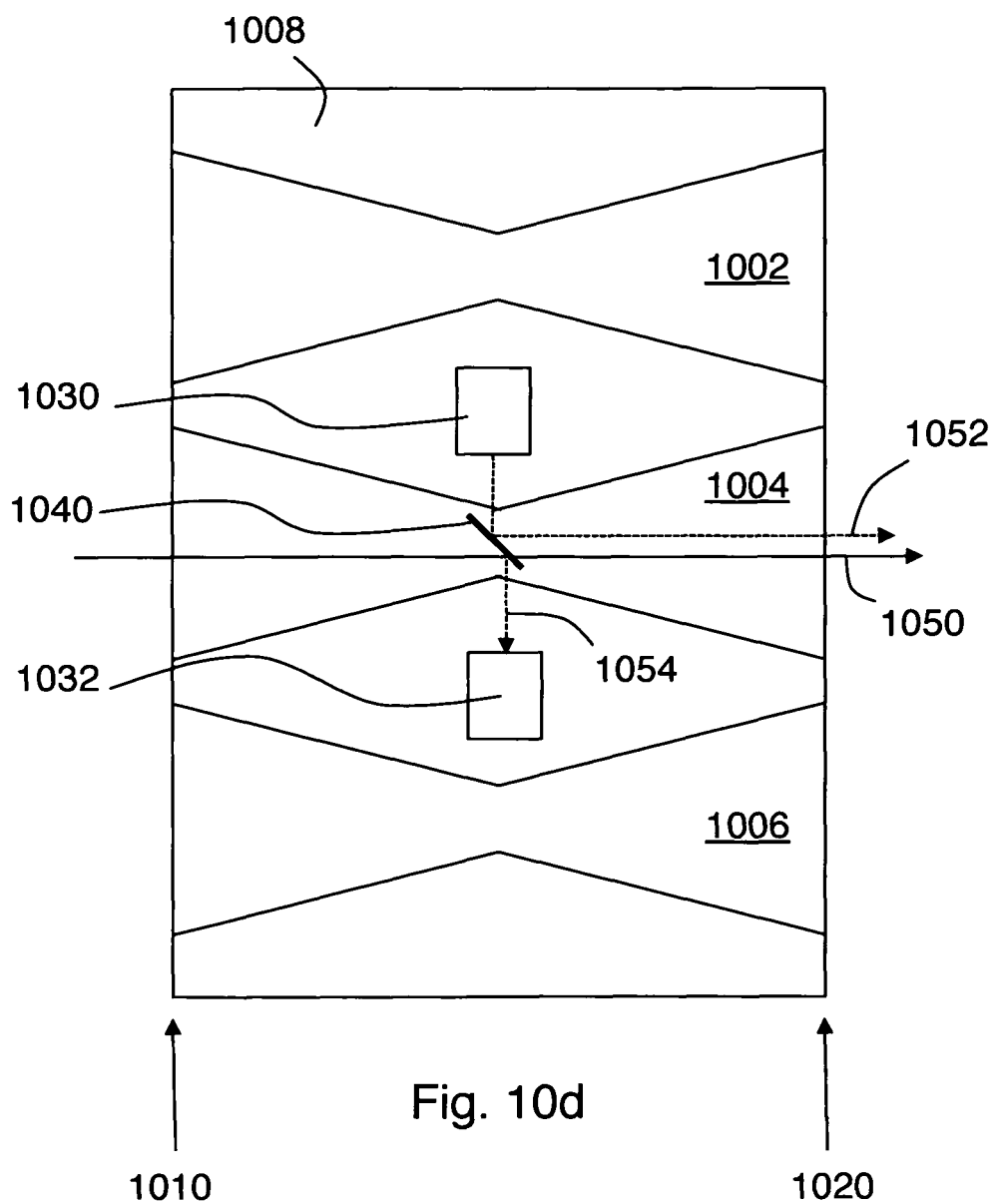
FIG. 10d shows an application of the cloaked devices of the window of FIG. 10c.

FIG. 10d shows one example of what can be done with such concealed devices. In this example, a beam splitter 1040 is disposed in one of the pixel elements (i.e., pixel element 1004). Concealed device 1030 is disposed such that light it emits (1052) is added to light 1050 that passes through the window. Concealed device 1032 is disposed to receive light 1054 that is sampled from light 1050 by the action of beam splitter 1040. Thus, concealed devices can add to and/or receive light that passes through the window. For simplicity, only one pixel element having a beam splitter is shown. Any number or all of the pixel elements can have such a beam splitter and associated concealed devices, thereby providing a window that has essentially unlimited capability to receive and/or modify light being transmitted through the window.

Figure 11:
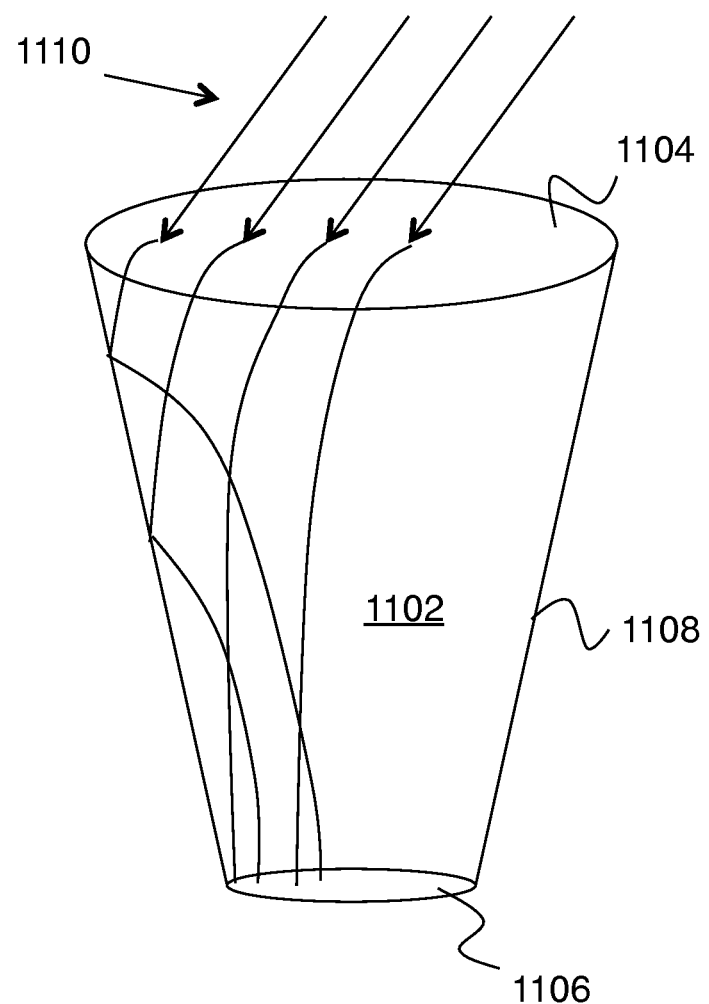
FIG. 11 shows another embodiment of the invention.

The embodiment of FIG. 11 shows an optical concentrator where element 1102 has a first optical port surface 1104 and a second optical port surface 1106 on opposite sides of the optical element. A reflective sidewall surface 1108 is disposed around the optical element such that the first and second optical port surface of the optical element are not included in the sidewall surface. The optical element has a graded refractive index that continuously increases from the first optical port surface to the second optical port surface and the first optical port surface has a larger area than the second optical port surface. Thus the device is an optical concentrator, as schematically shown by the paths of optical rays 1110.

The invention claimed is:

1. Apparatus comprising:
   an optical element having a first optical port surface and having a second optical port surface, wherein the first and second optical port surfaces are on opposite sides of the optical element; and
   a sidewall surface of the optical element disposed around the optical element such that the first and second optical port surfaces of the optical element are not included in the sidewall surface;
   wherein the optical element has a graded refractive index that continuously increases from the first optical port surface to the second optical port surface;
   wherein the first optical port surface has a larger area than the second optical port surface;
   wherein the sidewall surface provides optical reflection within the optical element via a metallic coating on the sidewall surface;
   wherein the first optical port surface has a first number of electromagnetic modes greater than or equal to two;
   wherein the second optical port surface has a second number of electromagnetic modes greater than or equal to two;
   wherein the first number of electromagnetic modes and the second number of electromagnetic modes are equal.

2. The apparatus of claim 1, wherein the sidewall surface has a generally funnel-like shape that decreases continuously in cross sectional area from the first optical port surface to the second optical port surface.

3. The apparatus of claim 1, wherein the optical element comprises a structure selected from the group consisting of: a polymer having nano-particles disposed in the polymer to provide the graded refractive index, meta-materials, a structure having nano-porosity in a matrix, a structure having both nano-pores and nano-particles in a matrix, sub-wavelength structures, and a continuously graded layered structure of distinct materials.

4. The apparatus of claim 1, wherein the optical element has rotational symmetry about a central axis of the optical element, wherein the rotational symmetry is a continuous symmetry or an N-fold discrete symmetry.

5. The apparatus of claim 4, wherein the graded refractive index of the optical element continuously increases as radius with respect to the central axis decreases.

6. The apparatus of claim 1, further comprising a multiplicity of scattering centers disposed in the optical element, whereby light passing through the optical element is diffused to provide more spatially uniform optical emission from the optical element.

7. The apparatus of claim 1, wherein the first optical port surface is planar or is curved to provide optical focusing.

8. A solar concentrator comprising:
   the apparatus of claim 1; and
   an absorbing element having an absorbing element refractive index;
   wherein the second optical port surface of the optical element is bonded to and in optical contact with the absorbing element, and wherein the refractive index of the optical element at the second port surface is substantially the same as the absorbing element refractive index.

9. The solar concentrator of claim 8, wherein the absorbing element comprises an element selected from the group consisting of: photovoltaic solar cells, thermal solar cells, cameras, charge-coupled device arrays, and imaging devices.

10. An optical emitter comprising:
    the apparatus of claim 1; and
    an optical source having an optical source refractive index;
    wherein the second optical port surface of the optical element is in optical contact with the optical source, and wherein the refractive index of the optical element at the second port surface is substantially the same as the optical source refractive index.

11. The optical emitter of claim 10, wherein the optical source comprises an element selected from the group consisting of: light emitting diodes, thermal light sources and lasers.

12. An optical transmission element comprising:
    a first apparatus according to claim 1; and
    a second apparatus according to claim 1;
    wherein the second port surface of the first apparatus is in optical contact with the second port surface of the second apparatus, whereby the first port surface of the first apparatus and the first port surface of the second apparatus form optically coupled first and second pixel faces, respectively.

13. An optical assembly comprising an array of optical transmission elements according to claim 12 disposed such that the first pixel faces are included in a first window surface and such that the second pixel faces are included in a second window surface.

14. The assembly of claim 13, further comprising one or more devices disposed between the first and second window surfaces, and disposed between the optical transmission elements, whereby light can propagate between the first and second window surfaces without intersecting the one or more devices.

15. The assembly of claim 14, further comprising one or more beam splitters coupled to the one or more devices and disposed in one or more of the optical transmission elements, whereby light propagating between the first and second window surfaces can be modified under control of the devices.

16. The apparatus of claim 1, wherein A is a ratio of first optical port surface area to second optical port surface area, wherein R is a ratio of second optical port surface refractive index to first optical port surface refractive index, and wherein A is less than or equal to $R^2$.

17. The apparatus of claim 1, wherein $\theta$ is an angle of incidence at the first optical port surface and wherein a power transfer from the first optical port surface to the second optical port surface has a $\cos(\theta)$ dependence.

18. The apparatus of claim 17, wherein the $\cos(\theta)$ dependence holds for $0 \leq \theta \leq 85$ degrees.

* * * * *